(12) United States Patent
Tanaka et al.

(10) Patent No.: US 7,630,815 B2
(45) Date of Patent: Dec. 8, 2009

(54) BRAKE CONTROL APPARATUS AND BRAKE CONTROL METHOD

(75) Inventors: Yoshito Tanaka, Nishikamo-gun (JP); Hiroshi Nakaoka, Okazaki (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 56 days.

(21) Appl. No.: 12/100,152

(22) Filed: Apr. 9, 2008

(65) Prior Publication Data
US 2008/0255743 A1 Oct. 16, 2008

(30) Foreign Application Priority Data
Apr. 10, 2007 (JP) .............................. 2007-102902

(51) Int. Cl.
*G06F 7/70* (2006.01)
*G06G 7/00* (2006.01)
*G06G 7/76* (2006.01)
*B60T 8/40* (2006.01)
*B60T 8/60* (2006.01)

(52) U.S. Cl. ..................... 701/70; 303/1; 303/2; 303/5; 303/155; 303/116.2

(58) Field of Classification Search ........................ None
See application file for complete search history.

(56) References Cited

FOREIGN PATENT DOCUMENTS

| JP | 10-16752 | 1/1998 |
|---|---|---|
| JP | 2003-11800 | 1/2003 |
| JP | 2006-123889 | 5/2006 |

*Primary Examiner*—Khoi Tran
*Assistant Examiner*—Nicholas Kiswanto
(74) *Attorney, Agent, or Firm*—Oblon, Spivak, McClellland, Maier & Neustadt, L.L.P.

(57) ABSTRACT

A brake control apparatus includes: at least one wheel cylinder that applies braking force to a vehicle wheel in response to supply of hydraulic fluid thereto; a manual hydraulic pressure source that pressurizes hydraulic fluid in accordance with brake operation by a driver; a cut valve which is arranged in a hydraulic fluid delivery path between the manual hydraulic pressure source and the wheel cylinder, and to which force is applied in such a direction that the cut valve is closed when the wheel cylinder is higher in hydraulic pressure than the manual hydraulic pressure source; and a controller that controls a discharge path, through which the hydraulic fluid is discharged from the wheel cylinder and which differs from the hydraulic fluid delivery path, so that discharge of the hydraulic fluid from the wheel cylinder through the discharge path starts in response to release of the brake.

2 Claims, 4 Drawing Sheets

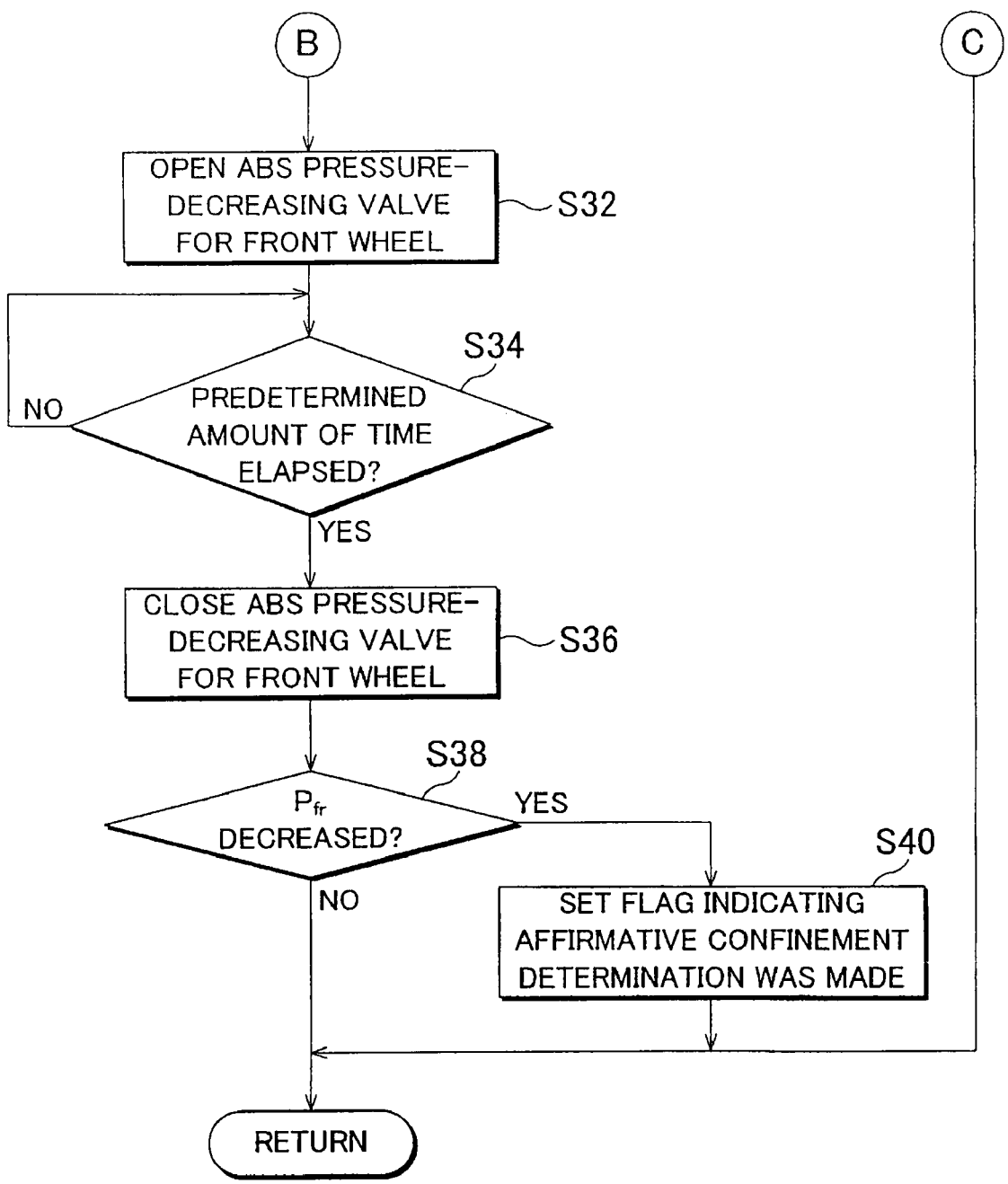

BRAKE CONTROL APPARATUS AND BRAKE CONTROL METHOD

INCORPORATION BY REFERENCE

The disclosure of Japanese Patent Application No. 2007-102902 filed on Apr. 10, 2007 including the specification, drawings and abstract is incorporated herein by reference in its entirety.

BACKGROUND OF THE INVENTION

1. Field of Invention

The invention relates to a brake control apparatus and brake control method for controlling a braking force applied to wheels of a vehicle.

2. Description of Related Art

Japanese Patent Application Publication No. 2006-123889 (JP-A-2006-123889) describes a hydraulic brake apparatus including a hydraulic pressure booster, a master cylinder, a power hydraulic pressure source and multiple brake cylinders. In this hydraulic brake apparatus, the multiple brake cylinders may be selectively communicated with the hydraulic pressure booster, the master cylinder and the power hydraulic pressure source using a simple circuit. This structure provides greater control over a hydraulic pressure. When a system operates properly, the hydraulic fluid is supplied from the power hydraulic pressure source to the brake cylinders. When a malfunction is detected, a control mode other than the control, which is selected when the system operates properly, is selected. For example, the control mode may be shifted to a control mode where the system is divided into a system in which the hydraulic fluid is supplied from the master cylinder to part of the wheel cylinders and a system in which the hydraulic fluid is supplied from the hydraulic pressure booster to the remaining cylinders.

Japanese Patent Application Publication No. 10-16752 (JP-A-10-16752) describes a brake hydraulic pressure control unit that includes control hydraulic pressure generating means for generating a hydraulic pressure corresponding to a command value. If an excessive hydraulic pressure is applied to wheel cylinders by the control hydraulic pressure generating means during a braking operation, the control unit shuts off communication between the control hydraulic pressure generating means and the wheel cylinders, and allows communication between the wheel cylinders and a reservoir tank.

Damage of a built-in spring in a cut valve provided in a hydraulic fluid flow path that connects the master cylinder with the wheel cylinders is frequently a cause of malfunctions. If the spring is damaged and, as a result, the biasing force of the spring is reduced, the cut valve may remain closed depending on the pressure difference between the master cylinder and the wheel cylinders. In particular, in the case where a braking force is controlling by directly delivering the hydraulic fluid between the master cylinder and the wheel cylinders, the pressure difference between the master cylinder and the wheel cylinders is transiently changed in accordance with a braking operation performed by a driver. At this time, a pressure difference large enough to close a control valve is caused relatively frequently, thereby creating a possibility that the hydraulic pressure is confined within the wheel cylinders.

SUMMARY OF THE INVENTION

The invention provides a brake control technology for suppressing occurrence of confinement of a hydraulic pressure within a wheel cylinder.

A first aspect of the invention relates to a brake control apparatus including: at least one wheel cylinder that applies a braking force to a wheel of a vehicle in response to a supply of a hydraulic fluid to the wheel cylinder; a manual hydraulic pressure source that pressurizes a hydraulic fluid in accordance with an operation of a brake performed by a driver; a cut valve which is arranged in a hydraulic fluid delivery path between the manual hydraulic pressure source and the wheel cylinder, and to which a force is applied in such a direction that the cut valve is closed when a hydraulic pressure in the wheel cylinder is higher than a hydraulic pressure in the manual hydraulic pressure source; and a controller that controls a discharge path, through which the hydraulic fluid is discharged from the wheel cylinder and which is different from the hydraulic fluid delivery path, so that a discharge of the hydraulic fluid from the wheel cylinder through the discharge path is started in response to a release of the brake.

If the brake is released in the case where the hydraulic fluid is supplied from the manual hydraulic pressure source to the wheel cylinder, the hydraulic fluid is usually returned from the wheel cylinder to the manual hydraulic pressure source through the path through which the hydraulic pressure is supplied to the wheel cylinder. When the brake is released, the wheel cylinder pressure starts decreasing after the manual hydraulic pressure source starts decreasing. There is a slight time lag between a decrease in the manual hydraulic pressure source and a decrease in the wheel cylinder pressure. This is because it takes a certain period of time, although not much, for the hydraulic fluid to return from the wheel cylinder to the manual hydraulic pressure source. Due to this time lag, the wheel cylinder pressure is transiently slightly higher than the pressure in the manual hydraulic pressure source. This differential pressure is applied in such a direction that the cut valve is closed. When an opening force of the cut valve, for example, a biasing force of a built-in spring of the cut valve is weak, especially, when a malfunction, for example, breakage of the spring has occurred in the cut valve, the cut valve may be closed due to the differential pressure and therefore the hydraulic pressure may be confined within the wheel cylinder. However, according to the first aspect of the invention, the hydraulic fluid is promptly discharged though the discharge path that differs from the hydraulic fluid delivery path when the brake is released. Therefore, the differential pressure applied to the cut valve is promptly decreased to suppress confinement of the hydraulic pressure within the wheel cylinder.

In the first aspect of the invention, a pressure-decreasing valve that decreases the hydraulic pressure in the wheel cylinder may be further provided, the hydraulic fluid delivery path may be formed in such a manner that communication is provided between the manual hydraulic pressure source and the wheel cylinder in a non-controlled state, and the controller may open the pressure-decreasing valve in response to the release of the brake.

With this configuration, when the brake is released in the non-controlled state, a simple control is executed, that is, the pressure-decreasing valve is opened. In this way, it is possible to provide sufficient fail-safe properties by obtaining a sufficient braking force in the non-controlled state, for example, in a state where a malfunction has occurred, and to easily eliminate confinement of the hydraulic pressure, which is likely to occur when the brake is released, by executing the minimum control.

In the first aspect of the invention, a plurality of wheel cylinders may be provided, the brake control apparatus may further include a partition valve that divides the hydraulic fluid delivery path into a first system through which the hydraulic fluid is supplied to at least one of the wheel cylinders and a second system through which the hydraulic fluid is supplied to the other of the wheel cylinders, the hydraulic fluid delivery path may be formed in such a manner that communication is provided between the manual hydraulic pressure source and the wheel cylinders through the first system and the second system in a non-controlled state, and the controller may open the partition valve in response to the release of the brake.

With this configuration, when the brake is released in the non-controlled state, a simple control is executed, that is, the partition valve is opened. As a result, even if confinement of the hydraulic pressure has occurred within one of the systems, the hydraulic fluid is discharged though the other system. As a result, it is possible to eliminate the confinement of the hydraulic pressure.

In the first aspect of the invention, a hydraulic pressure sensor that measures the hydraulic pressure in the wheel cylinder may be further provided, and the controller may determine whether the hydraulic pressure is confined within the wheel cylinder based on the measured value obtained by the hydraulic pressure sensor when the brake is released, and control the discharge path if it is determined that the hydraulic pressure is confined within the wheel cylinder.

With this configuration, it is possible to control the discharge path when confinement of the hydraulic pressure actually occurs. Therefore, it is possible to reduce the frequency of opening and closing the control valve used to control the discharge path.

A second aspect of the invention relates to a brake control method for controlling a brake control apparatus that includes: at least one wheel cylinder that applies a braking force to a wheel of a vehicle in response to a supply of a hydraulic fluid to the wheel cylinder; a manual hydraulic pressure source that pressurizes a hydraulic fluid in accordance with an operation a brake performed by a driver; and a cut valve which is arranged in a hydraulic fluid delivery path between the manual hydraulic pressure source and the wheel cylinder, and to which a force is applied in such a direction that the cut valve is closed when a hydraulic pressure in the wheel cylinder is higher than a hydraulic pressure in the manual hydraulic pressure source. According to the brake control method, a discharge path, through which the hydraulic fluid is discharged from the wheel cylinder and which is different from the hydraulic fluid delivery path, is controlled so that a discharge of the hydraulic fluid from the wheel cylinder through the discharge path is started when the brake is released.

According to the second aspect of the invention, it is possible to suppress the confinement of the hydraulic pressure within the wheel cylinder.

BRIEF DESCRIPTION OF THE DRAWINGS

The above and other features and advantages of the invention will become apparent from the following description of example embodiments, given in conjunction with the accompanying drawings in which.

DETAILED DESCRIPTION OF EXAMPLE EMBODIMENTS

Hereafter, example embodiments of the invention will be described in detail with reference to the accompanying drawings.

Figure 1:
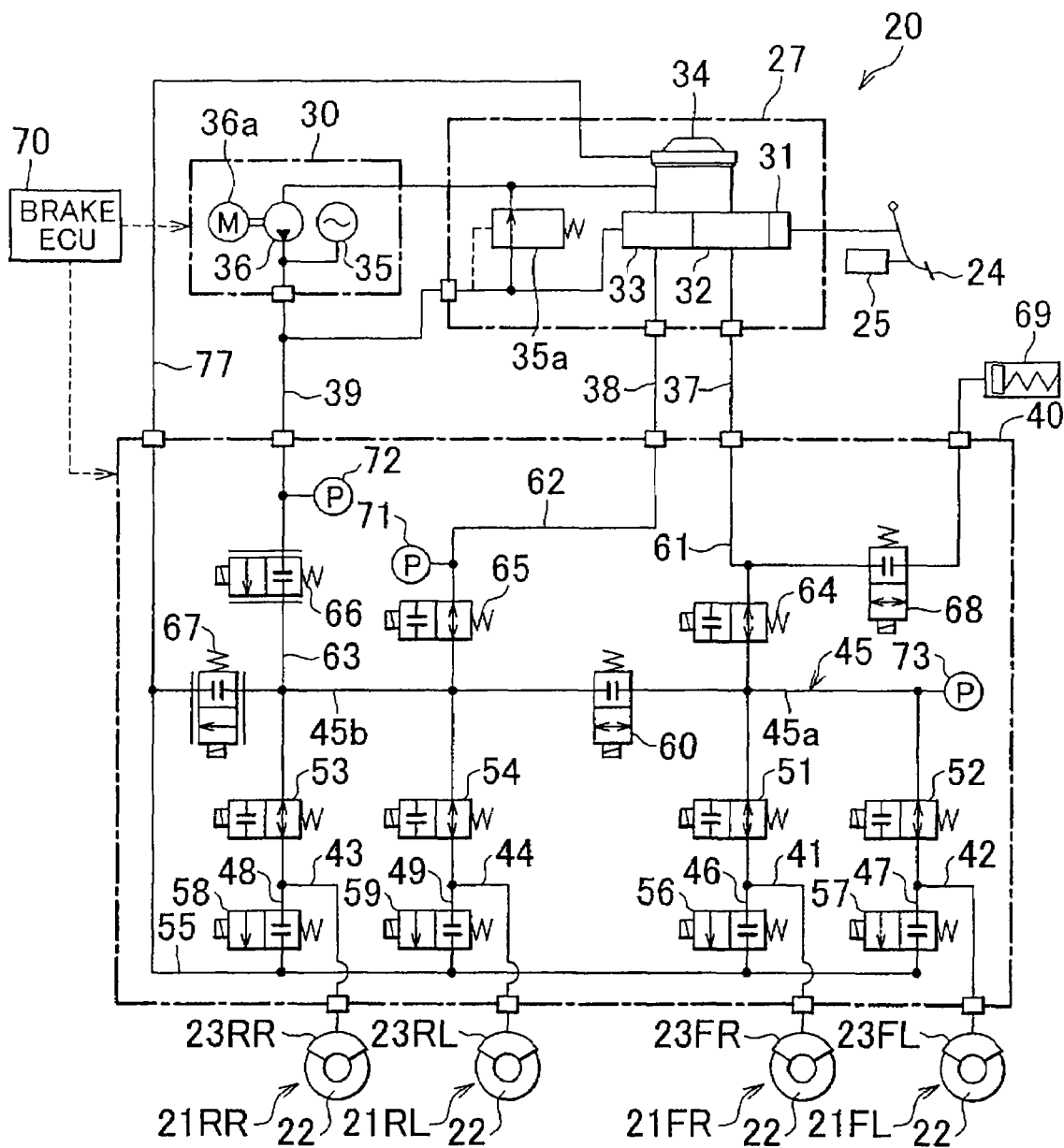
FIG. 1 is a system diagram showing a brake control apparatus according to example embodiments of the invention.

FIG. 1 is a system diagram showing a brake control apparatus 20 according to embodiments of the invention. The brake control apparatus 20 shown in FIG. 1 forms an electronically-controlled brake system (ECB) for a vehicle, and controls braking forces applied to four wheels of the vehicle. The brake control apparatus 20 according to the embodiments of the invention may be mounted in, for example, a hybrid vehicle which includes an electric motor and an internal combustion engine as drive power sources. In such hybrid vehicle, each of the regenerative braking control, in which the vehicle speed is reduced by converting some of kinetic energy of the vehicle into electrical energy, and the hydraulic braking control, in which the vehicle speed is reduced using the brake control apparatus 20, may be executed. In the vehicle in the embodiments of the invention, the cooperative braking control may be executed. In the cooperative braking control, the regenerative braking control and the hydraulic braking control are executed in combination to generate a required braking force.

As shown in FIG. 1, the brake control apparatus 20 includes disk brake units 21FR, 21FL, 21RR and 21RL provided to the respective wheels, a master cylinder unit 27, a power hydraulic pressure source 30 and a hydraulic pressure actuator 40.

The disk brake units 21FR, 21FL, 21RR and 21RL apply braking forces to the front-right wheel, the front-left wheel, the rear-right wheel and the rear-left wheel, respectively. The master cylinder unit 27, which functions as a manual hydraulic pressure source according to the embodiments of the invention, sends, to the disk brake units 21FR to 21RL, the brake fluid that is pressurized in accordance with the amount by which a driver has operated a brake pedal 24 that serves as a brake operation member. The power hydraulic pressure source 30 is able to send, to the disk brake units 21FR to 21RL, the brake fluid, which is the hydraulic fluid pressurized due to a power supplied thereto, independently of the operation of the brake pedal 24 performed by the driver. The hydraulic pressure actuator 40 appropriately adjusts the hydraulic pressure of the brake fluid that is supplied from the power hydraulic pressure source 30 or the master cylinder unit 27, and then sends the brake fluid to the disk brake units 21FR to 21RL. With this structure, the braking forces that will be applied to the respective wheels by hydraulic braking are appropriately adjusted.

The disk brake units 21FR to 21RL, the master cylinder unit 27, the power hydraulic pressure source 30 and the hydraulic pressure actuator 40 will be described below in detail. The disk brake units 21FR, 21FL, 21RR and 21RL include brake disks 22 and wheel cylinders 23FR, 23FL, 23RR and 23RL housed in brake calipers, respectively. The wheel cylinders 23FR to 23RL are connected to the hydraulic pressure actuator 40 through respective fluid passages. Hereinafter, the wheel cylinders 23FR to 23RL will be collectively referred to as the "wheel cylinders 23" where appropriate.

In each of the disk brake units 21FR to 21RL, when the brake fluid from the hydraulic pressure actuator 40 is supplied to the wheel cylinder 23, a brake pad, which serves as a friction member, is pushed against the brake disk 22 that rotates together with the wheel. As a result, a braking force is applied to the wheel. In the embodiments of the invention, the disk brake units 21FR to 21RL are used. Alternatively, another type of braking force application mechanisms including wheel cylinders, for example, drum brakes may be used.

The master cylinder unit 27 used in the embodiments of the invention mainly includes a master cylinder with a hydraulic pressure booster. The master cylinder unit 27 includes a hydraulic pressure booster 31, a master cylinder 32, a regulator 33 and a reservoir 34. A pedal depressing force applied to the brake pedal 24 by the driver is transferred and used to pressurize the brake fluid in the master cylinder 32. The hydraulic pressure booster 31 is connected to the brake pedal 24, and amplifies the pedal depressing force applied to the brake pedal 24 and then transfers the amplified force to the master cylinder 32. The brake fluid is supplied from the power hydraulic pressure source 30 to the hydraulic pressure booster 31 via the regulator 33, whereby the pedal depressing force is amplified. The master cylinder 32 generates a master cylinder pressure having a predetermined boost ratio with respect to the pedal depressing force.

The reservoir 34 that stores the brake fluid is provided on the master cylinder 32 and the regulator 33. The master cylinder 32 is communicated with the reservoir 34 when the brake pedal 24 is released. The regulator 33 is communicated with both the reservoir 34 and an accumulator 35 of the power hydraulic pressure source 30. The regulator 33 generates a hydraulic pressure that is substantially equal to the master cylinder pressure, using the reservoir 34 as a low pressure source, and the accumulator 35 as a high pressure source. Hereinafter, the hydraulic pressure in the regulator 33 will be referred to as the "regulator pressure" where appropriate. The master cylinder pressure and the regulator pressure need not be exactly equal to each other. For example, the master cylinder unit 27 may be designed such that the regulator pressure is slightly higher than the master cylinder pressure.

The power hydraulic pressure source 30 includes the accumulator 35 and a pump 36. The accumulator 35 converts the pressure energy of the brake fluid boosted by the pump 36 into pressure energy of a filler gas such as nitrogen, for example, pressure energy of approximately 14 MPa to approximately 22 MPa and accumulates the converted pressure energy. The pump 36 is provided with a motor 36a that is used as a drive power source. The inlet of the pump 36 is connected to the reservoir 34, and the outlet of the pump 36 is connected to the accumulator 35. The accumulator 35 is also connected to a relief valve 35a included in the master cylinder unit 27. When the pressure of the brake fluid in the accumulator 35 is increased to an excessively high pressure, for example, approximately 25 MPa, the relief valve 35a opens and the brake fluid having such excessively high pressure is returned to the reservoir 34.

As described above, the brake control apparatus 20 includes the master cylinder 32, the regulator 33 and the accumulator 35 that serve as the sources that supply brake fluid to the wheel cylinder 23. A master conduit 37 is connected to the master cylinder 32, a regulator conduit 38 is connected to the regulator 33, and an accumulator conduit 39 is connected to the accumulator 35. The master conduit 37, regulator conduit 38 and accumulator conduit 39 are connected to the hydraulic pressure actuator 40.

The hydraulic pressure actuator 40 includes an actuator block in which multiple fluid passages are formed, and multiple electromagnetically-controlled valves. The multiple fluid passages formed in the actuator block include individual fluid passages 41, 42, 43, and 44, and a main fluid passage 45. The individual fluid passages 41, 42, 43 and 44 branch off from the main fluid passage 45, and are connected to the wheel cylinders 23FR, 23FL, 23RR, and 23RL of the disk brake units 21FR, 21FL, 21RR, and 21RL, respectively. With this structure, each wheel cylinder 23 may communicate with the main fluid passage 45.

ABS holding valves 51, 52, 53 and 54 are provided at the middle portions of the individual fluid passages 41, 42, 43, and 44, respectively. Each of the ABS holding valves 51 to 54 includes an ON/OFF solenoid valve, and a spring. Each of the ABS holding valves 51 to 54 is a normally-open electromagnetically-controlled valve that is open when electricity is not supplied to the solenoid valve. When the ABS holding valves 51 to 54 are open, the brake fluid is allowed to flow from the main passage 45 to the wheel cylinders 23, or from the wheel cylinders 23 to the main passage 45. When the solenoid valves are supplied with electricity and the ABS holding valves 51 to 54 are closed, flows of the brake fluid through the individual fluid passages 41 to 44 are shut off.

The wheel cylinders 23 are connected to a reservoir fluid passage 55 through pressure-decreasing fluid passages 46, 47, 48 and 49 connected to the respective individual fluid passages 41, 42, 43 and 44. ABS pressure-decreasing valves 56, 57, 58 and 59 are provided at the middle portions of the pressure-decreasing fluid passages 46, 47, 48 and 49, respectively. Each of the ABS pressure-decreasing valves 56 to 59 includes an ON/OFF solenoid valve, and a spring. Each of the ABS pressure-decreasing valves 56 to 59 is a normally-closed electromagnetically-controlled valve that is closed when electricity is not supplied to the solenoid valve. When the ABS pressure-decreasing valves 56 to 59 are closed, flows of the brake fluid through the pressure-decreasing fluid passages 46 to 49 are shut off. When electricity is supplied to the solenoid valves, and the ABS pressure-decreasing valves 56 to 59 are open, the brake fluid is allowed to flow through the pressure-decreasing fluid passages 46 to 49. As a result, the brake fluid flows back from the wheel cylinders 23 to the reservoir 34 through the pressure-decreasing fluid passages 46 to 49 and the reservoir fluid passage 55. The reservoir fluid passage 55 is connected to the reservoir 34 of the master cylinder unit 27 through a reservoir conduit 77.

A partition valve 60 is provided at the middle portion of the main fluid passage 45. The partition valve 60 partitions the main fluid passage 45 into a first fluid passage 45a connected to the individual fluid passages 41 and 42, and a second fluid passage 45b connected to the individual fluid passages 43 and 44. The first fluid passage 45a is connected to the wheel cylinders 23FR and 23FL of the front wheels via the individual fluid passages 41 and 42, respectively. The second fluid passage 45b is connected to the wheel cylinders 23RR and 23RL of the rear wheels via the individual fluid passages 43 and 44, respectively.

The partition valve 60 includes an ON/OFF solenoid valve, and a spring. The partition valve 60 is a normally-closed electromagnetically-controlled valve which is closed when electricity is not supplied to the solenoid valve. When the partition valve 60 is closed, a flow of the brake fluid through the main fluid passage 45 is shut off. When electricity is supplied to the solenoid valve, and the partition valve 60 is open, the brake fluid is allowed to flow from the first fluid passage 45a to the second fluid passage 45b, or from the second fluid passage 45b to the first fluid passage 45a.

A master fluid passage 61 and a regulator fluid passage 62, which are communicated with the main fluid passage 45, are formed in the hydraulic pressure actuator 40. More specifically, the master fluid passage 61 is connected to the first fluid passage 45a of the main fluid passage 45, and the regulator fluid passage 62 is connected to the second fluid passage 45b of the main fluid passage 45. The master fluid passage 61 is connected to the master conduit 37 communicated with the master cylinder 32. The regulator fluid passage 62 is connected to the regulator conduit 38 communicated with the regulator 33.

A master cut valve 64 is provided at the middle portion of the master fluid passage 61. The master cut valve 64 is provided on the path through which the brake fluid is supplied from the master cylinder 32 to the wheel cylinders 23. The master cut valve 64 includes an ON/OFF solenoid valve, and a spring. The master cut valve 64 is a normally-open electromagnetically-controlled valve that is kept closed by the electromagnetic force generated by the solenoid valve upon reception of a prescribed magnitude of control current, and that is open when electricity is not supplied to the solenoid valve. When the master cut valve 64 is open, the brake fluid is allowed to flow from the master cylinder 32 to the first fluid passage 45a of the main fluid passage 45, or from the first fluid passage 45a to the master cylinder 32. When the prescribed magnitude of control current is supplied to the solenoid valve and the master cut valve 64 is closed, a flow of the brake fluid through the master fluid passage 61 is shut off.

As shown in FIG. 1, the master cut valve 64 is arranged in such a manner that, when the hydraulic pressure in the wheel cylinder 23 is higher than the hydraulic pressure in the master cylinder 32, the differential pressure is applied in such a direction that the master cut valve 64 is closed. That is, when the hydraulic pressure in the wheel cylinder 23 is higher than the hydraulic pressure in the master cylinder 32, the hydraulic pressure is applied in such a direction that a ball-shaped valve element approaches a valve seat. This direction will be referred to as "self-closing direction" where appropriate. On the other hand, when the hydraulic pressure in the master cylinder 32 is higher than the hydraulic pressure in the wheel cylinder 23, the differential pressure is applied in such a direction that the master cut valve 64 opens.

A stroke simulator 69 is connected to the master fluid passage 61 via simulator cut valve 68, at a position upstream of the master cut valve 64. That is, the simulator cut valve 68 is provided on the fluid passage that connects the master cylinder 32 and the stroke simulator 69 to each other. The simulator cut valve 68 includes an ON/OFF solenoid valve, and a spring. The simulator cut valve 68 valve is a normally-closed electromagnetically-controlled valve that is kept open by the electromagnetic force generated by the solenoid valve upon reception of a prescribed magnitude of control current, and that is closed when electricity is not supplied to the solenoid valve. When the simulator cut valve 68 is closed, a flow of the brake fluid between the master passage 61 and the stroke simulator 69 is shut off. When electricity is supplied to the solenoid valve, and the simulator cut valve 68 is open, the brake fluid is allowed to flow from the master cylinder 32 to the stroke simulator 69, or from the stroke simulator 69 to the master cylinder 32.

The stroke simulator 69 includes multiple pistons and springs. The stroke simulator 69 generates a reaction force corresponding to the pedal depressing force applied to the brake pedal 24 by the driver, when the simulator cut valve 68 is open. To improve the brake operating feel felt by the driver, preferably, a stroke simulator having multi-stage spring characteristics is employed as the stroke simulator 69.

A regulator cut valve 65 is provided at the middle portion of the regulator fluid passage 62. The regulator cut valve 65 is provided on the path through which the brake fluid is supplied from the regulator 33 to the wheel cylinders 23. The regulator cut valve 65 also includes an ON/OFF solenoid valve, and a spring. The regulator cut valve 65 is a normally-open electromagnetically-controlled valve that is kept closed by the electromagnetic force generated by the solenoid valve upon reception of a prescribed magnitude of control current, and that is open when electricity is not supplied to the solenoid valve. When the regulator cut valve 65 is open, the brake fluid is allowed to flow from the regulator 33 to the second fluid passage 45b of the main fluid passage 45, or from the second fluid passage 45b to the regulator 33. When electricity is supplied to the solenoid valve and the regulator cut valve 65 is closed, a flow of the brake fluid through the regulator fluid passage 62 is shut off.

As shown in FIG. 1, the regulator cut valve 65 is arranged in such a manner that, when the hydraulic pressure in the wheel cylinder 23 is higher than the hydraulic pressure in the regulator 33, the differential pressure is applied in such a direction that the regulator cut valve 65 is closed. That is, when the hydraulic pressure in the wheel cylinder 23 is higher than the hydraulic pressure in the regulator 33, the hydraulic pressure is applied in such a direction that a ball-shaped valve element approaches a valve seat. On the other hand, when the hydraulic pressure in the regulator 33 is higher than the hydraulic pressure in the wheel cylinder 23, the differential pressure is applied in such a direction that the regulator cut valve 65 opens.

In addition to the master fluid passage 61 and the regulator fluid passage 62, an accumulator fluid passage 63 is also formed in the hydraulic pressure actuator 40. One end of the accumulator fluid passage 63 is connected to the second fluid passage 45b of the main fluid passage 45, and the other end thereof is connected to the accumulator conduit 39 that is communicated with the accumulator 35.

A pressure-increasing linear control valve 66 is provided at the middle portion of the accumulator fluid passage 63. The accumulator fluid passage 63 and the second fluid passage 45b of the main fluid passage 45 are connected to a reservoir fluid passage 55 via pressure-decreasing linear control valve 67. Each of the pressure-increasing linear control valve 66 and the pressure-decreasing linear control valve 67 includes a solenoid valve and a spring. Each of the pressure-increasing linear control valve 66 and the pressure-decreasing linear control valve 67 is a normally-closed electromagnetically-controlled valve that is closed when electricity is not supplied to the solenoid valve. The opening amount of each of the pressure-increasing linear control valve 66 and the pressure-decreasing linear control valve 67 is adjusted in proportion to the magnitude of electric current supplied to the solenoid valve.

The pressure-increasing linear control valve 66 is a pressure-increasing control valve shared by all the multiple wheel cylinders 23 corresponding to the respective wheels. Similarly, the pressure-decreasing linear valve 67 is a pressure-decreasing control valve shared by all the multiple wheel cylinders 23. In the embodiments of the invention, the pressure-increasing linear control valve 66 and the pressure-decreasing linear control valve 67 serve as paired control valves that control the manner in which the hydraulic fluid from the power hydraulic pressure source 30 is supplied to the wheel cylinders 23. The cost performance is better when a linear control valve, for example, the pressure-increasing linear control valve 66 is shared by all the wheel cylinders 23 than when the wheel cylinder 23 are provided with respective linear control valves.

The pressure difference between the inlet and the outlet of the pressure-increasing linear control valve 66 corresponds to the pressure difference between the brake fluid in the accumulator 35 and the brake fluid in the main fluid passage 45. The pressure difference between the inlet and the outlet of the pressure-decreasing linear control valve 67 corresponds to the pressure difference between the brake fluid in the main fluid passage 45 and the brake fluid in the reservoir 34. When the electromagnetic driving force that corresponds to the electricity supplied to the linear solenoid valve of each of the pressure-increasing linear control valve 66 and the pressure-decreasing linear control valve 67 is denoted by F1, the biasing force of the spring is denoted by F2, and the pressure difference acting force corresponding to the pressure difference between the inlet and the outlet of each of the pressure-increasing linear control valve 66 and the pressure-decreasing linear control valve 67 is denoted by F3, the relationship among F1, F2 and F3 is expressed by the equation, F1+F3=F2. Accordingly, the pressure difference between the inlet and the outlet of each of the pressure-increasing linear control valve 66 and the pressure-decreasing linear control valve 67 is controlled by continuously controlling of the electricity supplied to the linear solenoid valve of each of the pressure-increasing linear control valve 66 and the pressure-decreasing linear control valve 67.

In the brake control apparatus 20, the power hydraulic pressure source 30 and the hydraulic pressure actuator 40 are controlled by a brake ECU 70 that functions as a control unit according to the embodiments of the invention. The brake ECU 70 is formed of a microprocessor including a CPU. The brake ECU 70 includes ROM that stores various programs, RAM that temporarily stores data input port, an output port, a communication port, etc. in addition to the CPU. The brake ECU 70 is able to communicate with, for example, a hybrid ECU (not shown), which is at a higher-level hierarchy. The brake ECU 70 controls the pump 36 of the power hydraulic pressure source 30 and the electromagnetically-controlled valves 51 to 54, 56 to 59, 60, and 64 to 68 included in the hydraulic pressure actuator 40, based on control signals from the hybrid ECU and signals from various sensors.

A regulator pressure sensor 71, an accumulator pressure sensor 72 and a control pressure sensor 73 are connected to the brake ECU 70. The regulator pressure sensor 71 detects the pressure of the brake fluid in the regulator fluid passage 62, i.e., the regulator pressure, at a position upstream of the regulator cut valve 65, and transmits a signal indicating the detected regulator pressure to the brake ECU 70. The accumulator pressure sensor 72 detects the pressure of the brake fluid in the accumulator fluid passage 63, i.e., the accumulator pressure, at a position upstream of the pressure-increasing linear control valve 66, and transmits a signal indicating the detected accumulator pressure to the brake ECU 70. The control pressure sensor 73 detects the pressure of the brake fluid in the first fluid passage 45a of the main fluid passage 45, and transmits a signal indicating the detected pressure to the brake ECU 70. The signals indicating the pressures detected by the pressure sensors 71 to 73 are transmitted to the brake ECU 70 at predetermined time intervals. Each time the brake ECU 70 receives the signal, the information indicated by the signal is stored in a certain memory region of the brake ECU 70.

When the partition valve 60 is open and therefore the first fluid passage 45 and second fluid passage 45b of the main fluid passage 45 are communicated with each other, the output value from the control pressure sensor 73 indicates the hydraulic pressure on the lower-pressure side of the pressure-increasing linear control valve 66 and, at the same time, indicates the hydraulic pressure on the higher-pressure side of the pressure-decreasing linear control valve 67. Therefore, the output value from the control pressure sensor 73 may be used to control the pressure-increasing linear control valve 66 and the pressure-decreasing linear control valve 67. When the pressure-increasing linear control valve 66 and the pressure-decreasing linear control valve 67 are closed and the master cut valve 64 is open, the output value from the control pressure sensor 73 indicates the master cylinder pressure. When the partition valve 60 is open to provide communication between the first fluid passage 45 and the second fluid passage 45b of the main fluid passage 45, the ABS holding valves 51 to 54 are open, and the ABS pressure-decreasing valves 56 to 59 are closed, the output value from the control pressure sensor 73 indicates the hydraulic pressure applied to each wheel cylinder 23, i.e., the wheel cylinder pressure.

In addition to the sensors described above, a stroke sensor 25 provided to the brake pedal 24 is connected to the brake ECU 70. The stroke sensor 25 detects the pedal stroke, which is the operation amount of the brake pedal 24, and transmits a signal indicating the detected pedal stroke to the brake ECU 70. The signal indicating the pedal stroke detected by the stroke sensor 25 is transmitted to the brake ECU 70 at predetermined time intervals. Each time the brake ECU 70 receives the signal, the information indicated by the signal is stored in a certain memory region of the brake ECU 70. Brake operation state detection means other than the stroke sensor 25 may be provided in addition to or instead of the stroke sensor 25, and may be connected to the brake ECU 70. The brake operation state detection means may be, for example, a pedal depressing force sensor that detects the depressing force applied to the brake pedal 24, or a brake switch that detects depression of the brake pedal 24.

The brake control apparatus 20 configured as described above is able to execute the cooperative braking control. The brake control apparatus 20 starts the braking operation upon reception of a braking command. A braking command is issued when a braking force should be applied to the vehicle, for example, when the driver depresses the brake pedal 24. The brake ECU 70 calculates the required braking force upon reception of a braking command. The brake ECU 70 calculates the required hydraulic braking force, that is, the braking force that should be generated by the brake control apparatus 20, by subtracting the regenerative braking force from the required braking force. In this case, a signal indicating the regenerative braking force is transmitted from the hybrid ECU to the brake control apparatus 20. The brake ECU 70 calculates target hydraulic pressures for the wheel cylinders 23FR to 23RL based on the required hydraulic braking force derived through the calculation. The brake ECU 70 sets the values of the control currents supplied to the pressure-increasing linear control valve 66 and the pressure-decreasing linear control valve 67 based on a feedback control law so that the wheel cylinder pressures match the target hydraulic pressures.

As a result, in the brake control apparatus 20, the brake fluid is supplied from the power hydraulic pressure source 30 to the wheel cylinders 23 via the pressure-increasing linear control valve 66, and the braking forces are applied to the wheels. In addition, the brake fluid is discharged, as required, from the wheel cylinders 23 via the pressure-decreasing linear control valve 67, to adjust the braking forces applied to the wheels. The power hydraulic pressure source 30, the pressure-increasing linear control valve 66, the pressure-decreasing linear control valve 67, etc. constitute a wheel cylinder pressure control system according to the embodiments of the invention. With the wheel cylinder pressure control system, a so-called brake-by-wire control is executed over a braking force. The wheel cylinder pressure control system is provided in parallel to the path through which the brake fluid is supplied from the master cylinder unit 27 to the wheel cylinders 23.

When the braking force is controlled by the wheel cylinder pressure control system, the brake ECU 70 closes the regulator cut valve 65 and the master cut valve 64 so that the brake fluid delivered from the regulator 33 and the master cylinder 32 is not supplied to the wheel cylinders 23. During the cooperative braking control, a pressure difference, which corresponds to the magnitude of regenerative braking force, is caused between upstream side and the downstream of each of the regulator cut valve 65 and the master cut valve 64.

The brake control apparatus 20 according to the embodiments of the invention is able to control the braking force using the wheel cylinder pressure control system, even when the required braking force is obtained only from the hydraulic braking force without using the regenerative braking force. Hereinafter, the control mode in which the braking force is controlled by the wheel cylinder pressure control system will be referred to as the "linear control mode" where appropriate, regardless of whether the cooperative braking control is executed. This control mode is sometimes referred to as the "brake-by-wire control."

When the required braking force is obtained only from the hydraulic braking force in the linear control mode, the brake ECU 70 executes the control using the regulator pressure or the master cylinder pressure as the target wheel cylinder pressure. In this case, however, it is not necessary to use the wheel cylinder pressure control system to supply the brake fluid to the wheel cylinders 23. This is because the required braking force can be generated if the master cylinder pressure or a regulator pressure, which is increased in accordance with the operation of the brake pedal 24 performed by the driver, is supplied to the wheel cylinders 23.

Accordingly, in the brake control apparatus 20, the brake fluid may be supplied from the regulator 33 to the wheel cylinders 23 when the regenerative braking force is not used, for example, when the vehicle is stopped. Hereinafter, the control mode in which the brake fluid is supplied from the regulator 33 to the wheel cylinders 23 will be referred to as the "regulator mode". The brake ECU 70 may change the control mode from the linear control mode to the regulator control mode and the braking force may be generated in the regulator mode while the vehicle is stopped. If the control mode is changed at the same time that the vehicle is stopped, the control mode is changed by a relatively simple control. More practically, the brake ECU 70 may change the control mode from the linear control mode to the regulator mode, when the regenerative braking control is terminated because the vehicle speed has been decreased sufficiently by the braking operation.

In the regulator mode, the brake ECU 70 opens the regulator cut valve 65 and the partition valve 60, and closes the master cut valve 64. The controls over the pressure-increasing linear control valve 66 and the pressure-decreasing linear control valve 67 are terminated and thus these valves are closed. As a result, the brake fluid is supplied from the regulator 33 to the wheel cylinders 23, and the braking forces are applied to the wheels by the regulator pressure. Because the power hydraulic pressure source 30, which serves as the high pressure source, is connected to the regulator 33, the regulator is able to generate a braking force using the pressure accumulated in the power hydraulic pressure source 30.

In the regulator mode described above, the brake ECU 70 shuts off the supply of control currents to the pressure-increasing linear control valve 66 and the pressure-decreasing linear control valve 67 to close these valves. As a result, these valves are brought into the non-operating state. Therefore, the pressure-increasing linear control valve 66 and the pressure-decreasing linear control valve 67 operate less frequently. This prolongs the service lives of the pressure-increasing linear control valve 66 and the pressure-decreasing linear control valve 67. That is, the durability of each of the pressure-increasing linear control valve 66 and the pressure-decreasing linear control valve 67 is enhanced.

During a control in the linear control mode, the wheel cylinder pressure may deviate from the target hydraulic pressure due to occurrence of a malfunction, for example, leakage of the hydraulic fluid somewhere in the system. The brake ECU 70 periodically determines whether the response of the wheel cylinder pressure to the control is abnormal based on, for example, the value detected by the control pressure sensor 73. The brake ECU 70 determines that the response of the wheel cylinder pressure to the control is abnormal, for example, when the deviation of the measured wheel cylinder pressure from the target hydraulic pressure exceeds a reference value. If it is determined that the response of the wheel cylinder pressure to the control is abnormal, the brake ECU 70 terminates the linear control mode, and changes the control mode to the manual brake mode. Likewise, if a malfunction is detected in the regulator mode, the brake ECU 70 changes the control mode to the manual brake mode. In the manual brake mode, the depressing force applied to the brake pedal 24 by the driver is converted to a hydraulic pressure and transferred to the wheel cylinders 23 to apply the braking force to the wheels. From the viewpoint of fail-safe function, the manual brake mode serves as a backup control mode.

One example of the backup control mode is a hydro-booster mode. The hydro-booster mode is a control mode in which the hydraulic fluid flow path extending from the master cylinder 32 to the wheel cylinders 23 is reliably formed so that a braking force is generated in response to the operation of the brake operation member. In the hydro-booster mode, the brake ECU 70 stops supplying the control currents to all of the electromagnetically-controlled valves to bring them into the non-controlled state. Therefore, the master cut valve 64 and the regulator cut valve 65, both of which are normally-open valves, are opened, whereas the partition valve 60 and the simulator cut valve 68, both of which are normally-closed valves, are closed. Further, the controls over the pressure-increasing linear control valve 66 and the pressure-decreasing linear control valve 67 are stopped, and the linear control valves 66 and 67 are closed.

As a result, the brake fluid supply path is divided into two brake fluid supply paths, that is, a master cylinder-side brake fluid supply path and a regulator-side brake fluid supply path. The master cylinder pressure is transferred to the wheel cylinders 23FR and 23FL for the front wheels, whereas the regulator pressure is transferred to the wheel cylinders 23RR and 23RL for the rear wheels. The destination of the hydraulic fluid delivered from the master cylinder 32 is changed from the stroke simulator 69 to the wheel cylinders 23FR and 23FL for the front wheels. Because the hydraulic pressure booster 31 is a mechanism that amplifies the pedal depressing force, the hydraulic pressure booster 31 continues to work even when the control mode is changed to the hydro-booster mode and supply of the control currents to the electromagnetically-controlled valves is shut off. In the hydro-booster mode, even if a malfunction in the control system prevents supply of electricity to the electromagnetically-controlled valves, a braking force is generated by using the hydraulic pressure booster. Therefore, employing the hydro-booster mode enhances the fail-safe properties.

For convenience, a master cylinder-side system and a regulator-side system in the hydro-booster mode will be referred to as "master system" and "regulator system", respectively, where appropriate. According to the embodiments of the invention, in the hydro-booster mode, the hydraulic fluid is supplied to the front wheels by the master system and the hydraulic fluid is supplied to the rear wheels by the regulator system. In this sense, the master system and the regulator system will be occasionally referred to as "front system" and "rear system", respectively.

If the brake pedal is released in the case where the hydraulic fluid is supplied from the manual hydraulic pressure source to the wheel cylinders, the hydraulic fluid is usually returned from the wheel cylinders to the manual hydraulic pressure source through the path through which the hydraulic pressure is supplied to the wheel cylinders. In the hydro-booster mode, each of the master system and the regulator system forms the hydraulic fluid delivery path. In the regulator mode, the main fluid passage 45, the regulator fluid passage 62 and the regulator conduit 38a constitute the hydraulic fluid delivery path.

When the brake pedal is released, the wheel cylinder pressure starts decreasing after the manual hydraulic pressure source starts decreasing. There is a slight time lag between a decrease in the manual hydraulic pressure source and a decrease in the wheel cylinder pressure. This is because it takes a certain period of time, although not much, for the hydraulic fluid to return from the wheel cylinders to the manual hydraulic pressure source. Due to this time lag, the wheel cylinder pressure is transiently slightly higher than the pressure in the manual hydraulic pressure source. In the embodiments of the invention, this differential pressure is applied in the self-closing direction of each of the master cut valve 64 and the regulator cut valve 65. If the force applied in the self-closing direction exceeds a biasing force of a built-in spring of the valve, or the biasing force is not generated due to breakage of the spring, the valve element is pushed against the valve seat and the master cut valve 64 is closed. This state will be referred to as "self-closed state".

If the built-in spring in the master cut valve 64 or the regulator cut valve 65 breaks, the biasing force of the spring becomes considerably smaller than that when the spring is in the normal state or becomes zero. Therefore, these cut valves are easily brought into the self-closed state by the hydraulic pressure transiently applied in the self-closing direction when the brake pedal is released. As a result, the hydraulic pressure may be confined within one or more of the wheel cylinders 23. Especially, when a braking force is generated in, for example, the hydro-booster mode or the regulator mode, in which the hydraulic fluid is delivered between the manual hydraulic pressure source and the wheel cylinders, the wheel cylinder pressure may be confined relatively frequently in the wheel cylinders 23 when the brake pedal is released.

Therefore, according to the embodiments of the invention, the brake ECU 70 controls a supplemental discharge path, which differs from the regular delivery path between the manual hydraulic pressure source and the wheel cylinders, so that discharge of the hydraulic fluid through this supplemental discharge path is started in response to a release of the brake pedal. The brake ECU 70 controls the supplemental discharge path when detecting that the brake-operation state is changed from the brake-on state to the brake-off state. The brake ECU 70 is configured to select one of the multiple control modes including the linear control mode, the regulator mode and the hydro-booster mode, and controls the braking force in the selected control mode. The brake ECU 70 starts a control in response to a release of the brake pedal so that the hydraulic fluid is discharged also through the supplemental discharge path that differs from the regular hydraulic fluid discharge path that is usually used in the selected control mode. This makes it possible to promptly eliminate at least one of the differential pressures applied to the master cut valve 64 and the regulator cut valve 65, thereby suppressing confinement of the wheel cylinder pressure within the wheel cylinders 23.

First, a first embodiment of the invention will be described. In the first embodiment of the invention, the brake ECU 70 opens the pressure-decreasing linear control valve 67 in response to a release of the brake pedal, thereby discharging the hydraulic fluid from the wheel cylinders 23. This promptly reduces at least the differential pressure applied to the regulator cut valve 65 in the regulator mode and the hydro-booster mode.

Figure 2:
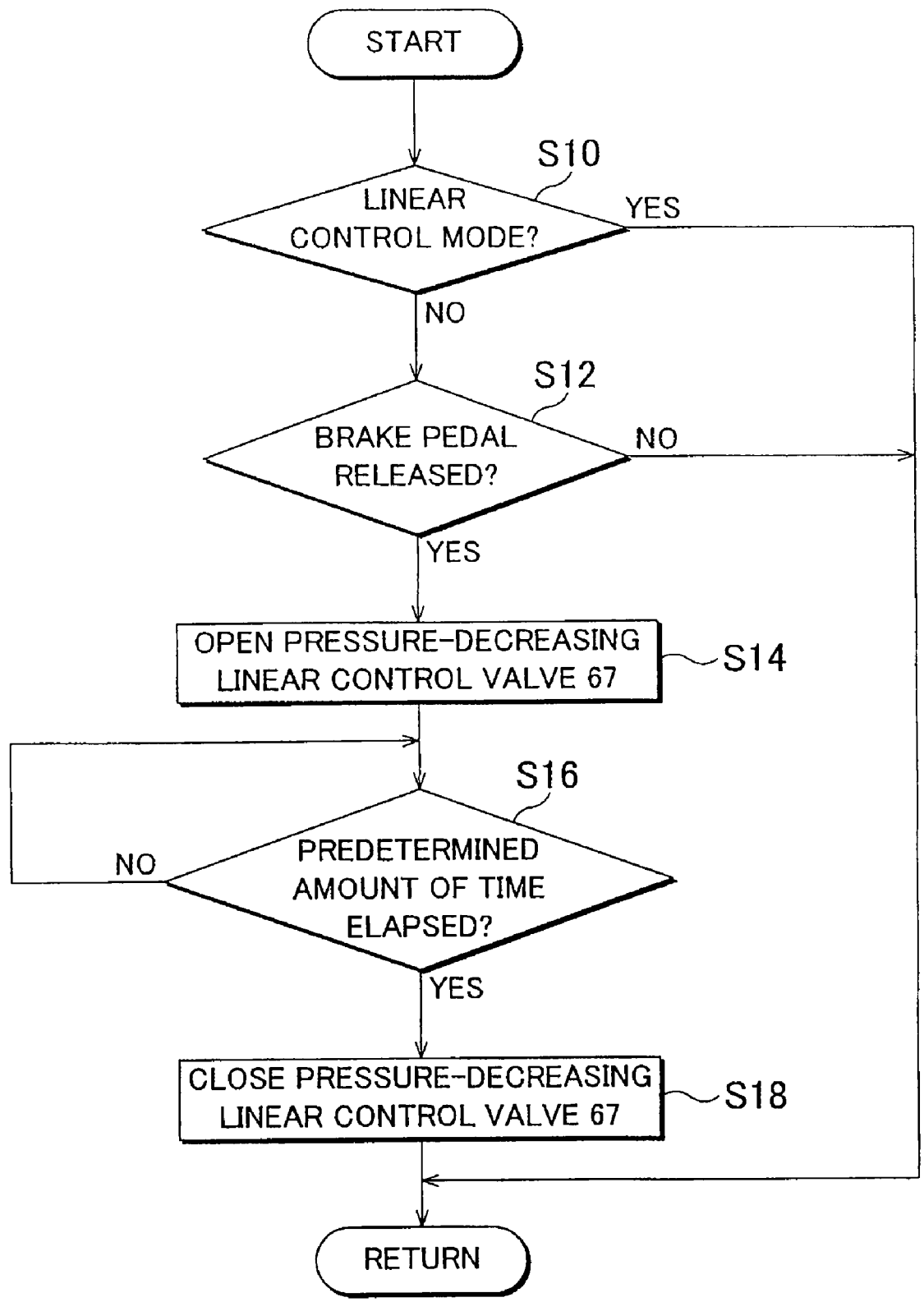
FIG. 2 is a flowchart for describing an example of the control routine executed when a brake pedal is released according to a first embodiment of the invention.

FIG. 2 is a flowchart for describing an example of the control routine executed when the brake pedal is released according to the first embodiment of the invention. The routine shown in FIG. 2 is periodically executed by the brake ECU 70 in the regulator mode and the hydro-booster mode. First, the brake ECU 70 determines whether the linear control mode has been selected as the control mode (S10). If it is determined that the linear control mode has been selected as the control mode ("YES" in S10), the brake ECU 70 ends the current routine.

On the other hand, if it is determined that the linear control mode has not been selected as the control mode ("NO" in S10), the brake ECU 70 determines whether the brake pedal has been released since the immediately preceding routine ends (S12). In the first embodiment of the invention, one of the linear control mode, the regulator mode and the hydro-booster mode may be selected as the control mode. Therefore, the regulator mode or the hydro-booster mode has been selected if the linear control mode has not been selected.

If the brake-operation state is changed from the brake-on state to the brake-off state, the brake ECU 70 determines that the brake pedal has been released. More specifically, the brake ECU 70 stores the brake-operation state determined in the immediately preceding routine, and determines that the brake pedal has been released if the brake-operation state is the brake-on state in the immediately preceding routine and the brake-operation state is the brake-off state in the current routine. The brake ECU 70 may determine that the brake-operation state is the brake-on state, for example, when a brake lamp switch is on, and determine that the brake-operation state is the brake-off state when the brake lamp switch is off. Alternatively, the brake ECU 70 may determine whether the brake-operation state is the brake-on state or the brake-off state based on the measured values obtained by various sensors such as the stroke sensor 25 and the regulator pressure sensor 71.

Before determining whether the brake pedal has been released, the brake ECU 70 may determine whether it is currently possible to determine whether the brake-operation state is the brake-on state or the brake-off state. More specifically, the brake ECU 70 may determine whether a malfunction has occurred in the sensors used to determine whether the brake pedal has been released. If no malfunction is detected, the brake ECU 70 determines whether the brake pedal has been released. On the other hand, if a malfunction is detected, the brake ECU 70 ends the current routine.

If it is determined that depression of the brake pedal continues ("NO" in S12), the brake ECU 70 ends the current routine. On the other hand, if it is determined that the brake pedal has been released ("YES" in S12), the brake ECU 70 opens the pressure-decreasing linear control valve 67 (S14). At this time, the brake ECU 70 supplies the pressure-decreasing linear control valve 67 with a control current great enough to fully open the pressure-decreasing linear control valve 67. Once the pressure-decreasing linear control valve 67 is opened, the hydraulic fluid is discharged from the wheel cylinders 23 to the reservoir 34 in the regulator mode. In the hydro-booster mode, the partition valve 60 remains closed and, therefore, the hydraulic fluid is discharged from the wheel cylinders 23RR and 23RL for the rear wheels to the reservoir 34.

The brake ECU 70 determines whether a predetermined length of time has elapsed since the pressure-decreasing linear control valve 67 starts opening (S16). The predetermined length of time is set to the time required to reduce the wheel cylinder pressure to the hydraulic pressure at which the master cut valve 64 and the regulator cut valve 65 are not brought into the self-closed state. The predetermined length of time is set to, for example, the time required for reducing the wheel cylinder pressure down to the atmospheric pressure. The predetermined length of time may be determined experimentally or empirically. If it is determined that the predetermined length of time has not yet elapsed ("NO" in S16), the brake ECU 70 periodically executes S16 until it is determined that the predetermined length of time has elapsed. If it is determined that the predetermined length of time has elapsed ("YES" in S16), the brake ECU 70 stops supplying the control current to the pressure-decreasing linear control valve 67, thereby closing the pressure-decreasing linear control valve 67 to end the current routine (S18).

According to the first embodiment of the invention, the supplemental discharge path through which the hydraulic fluid is discharged from the wheel cylinders 23 to the reservoir 34 via the pressure-decreasing linear control valve 67 is used in addition to the regular delivery paths through which the hydraulic fluid is discharged from the wheel cylinders 23 to the master cylinder 32 and the regulator 33. Thus, when the brake pedal is released, the hydraulic fluid may be promptly discharged from the wheel cylinders 23 to reduce the differential pressures that are applied to the master cut valve 64 and the regulator cut valve 65. As a result, it is possible to suppress confinement of the wheel cylinder pressure, which would otherwise occur due to self-closing of the master cut valve 64 and the regulator cut valve 65. Furthermore, according to the first embodiment of the invention, because the supplemental discharge path is controlled after the brake pedal is released, it is possible to offer an excellent compromise between obtainment of a sufficient braking force during the operation of the brake pedal and suppression of confinement of the hydraulic pressure in the wheel cylinders 23 after the brake pedal is released.

According to a modified example of the first embodiment of the invention, the brake ECU 70 may execute a control so that another pressure-decreasing valve in the hydraulic actuator 40 is opened in addition to or instead of the pressure-decreasing linear control valve 67. In response to a release of the brake pedal, the brake ECU 70 may open, for example, at least one of the ABS pressure-decreasing valves 56 and 57 for the front wheels. In this way, it is possible to reduce the pressures in the wheel cylinders for the front wheels and the wheel cylinders for the rear wheels while maintaining the separation of the front system and the rear system in control modes where the system is divided into the front system and the rear system, for example, in the hydro-booster mode.

Further, in the control mode in which the partition valve 60 remains closed, for example, in the hydro-booster mode, the brake ECU 70 may, in response to a release of the brake pedal, open the partition valve 60 in addition to or instead of the pressure-decreasing linear control valve 67. By opening the partition valve 60, a supplemental discharge path that leads to the regulator 33 is formed in addition to the regular hydraulic fluid discharge path that extends from the wheel cylinders 23FR and 23FL for the front wheels to the master cylinder 32. Moreover, a supplemental discharge path that leads to the master cylinder 32 is formed in addition to the regular hydraulic fluid discharge path that extends from the wheel cylinders 23RR and 23RL for the rear wheels to the regulator 33. In this manner, because the supplemental discharge paths in addition to the regular hydraulic fluid discharge paths are formed, even when a malfunction has occurred in the built-in spring of one of the master cut valve 64 and the regulator cut valve 65, the hydraulic fluid is discharged via the other cut valve. Therefore, it is possible to suppress occurrence of confinement of the wheel cylinder pressure in the wheel cylinders 23.

Next, a second embodiment of the invention will be described. In the second embodiment of the invention, the brake ECU 70 determines whether confinement of the hydraulic pressure in the wheel cylinders has occurred when the brake pedal is released. If it is determined that confinement of the hydraulic pressure in the wheel cylinders has occurred, the brake ECU 70 controls the supplemental discharge path that differs from the regular hydraulic fluid discharge path. This makes it possible to reduce the frequency of opening and closing the control valve, because the supplemental discharge path is not controlled when confinement of the hydraulic pressure in the wheel cylinders has not occurred.

Figure 3A:
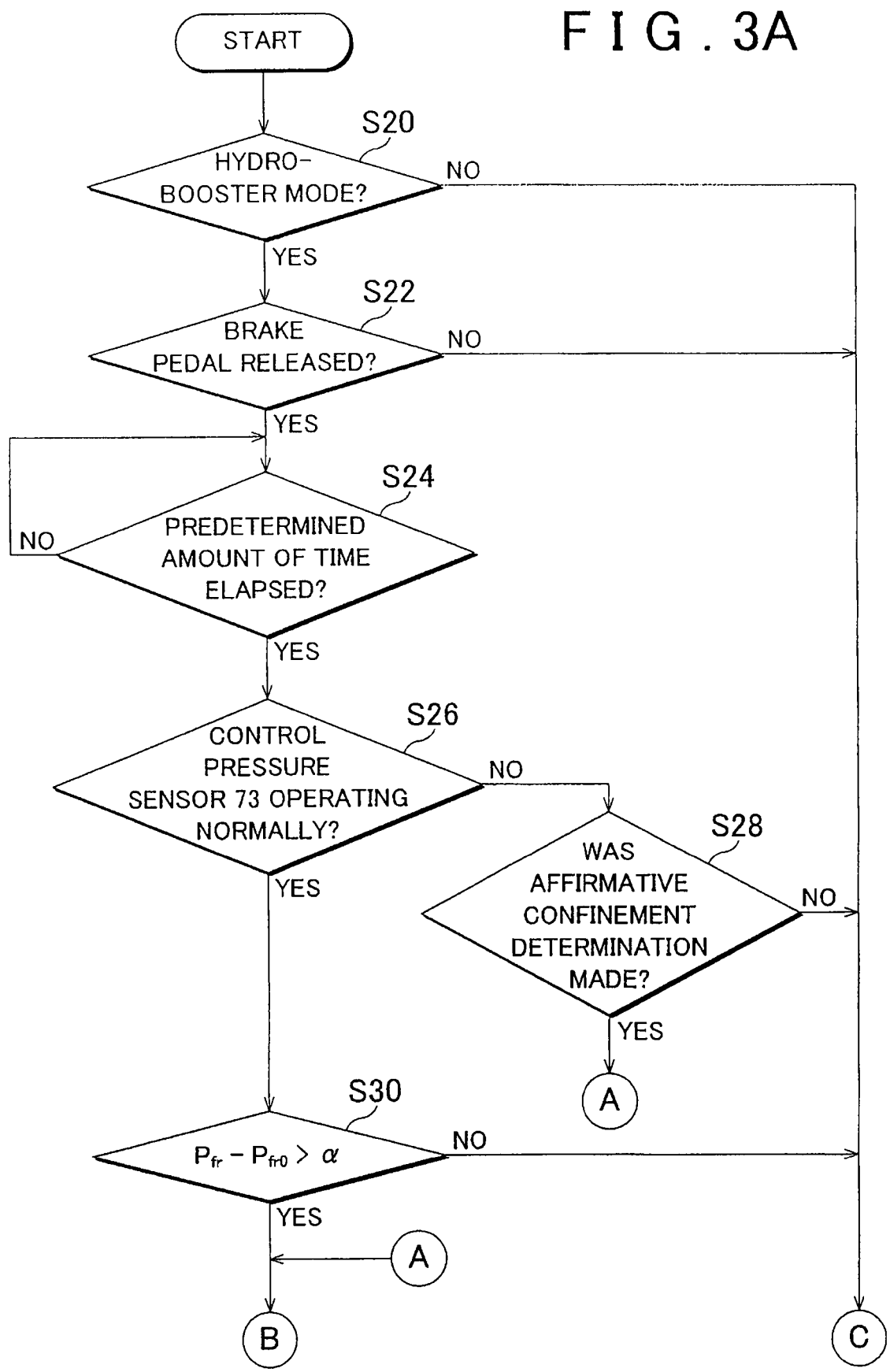
FIG. 3 is a flowchart for describing an example of the control routine executed when the brake pedal is released according to a second embodiment of the invention.

FIG. 3 is a flowchart for describing an example of the control routine executed when the brake pedal is released according to a second embodiment of the invention. The description will be provided on the assumption that the routine is executed in the hydro-booster mode. In this routine, the measured value obtained by the control pressure sensor 73 is used to determine whether confinement of the hydraulic pressure has occurred in the front system. If it is determined that confinement of the hydraulic pressure has occurred in the front system, the supplemental discharge path in the front system is controlled.

First, the brake ECU 70 determines whether the hydro-booster mode has been selected as the control mode (S20). If it is determined that the hydro-booster mode has not been selected ("NO" in S20), the brake ECU 70 ends the current routine. On the other hand, if it is determined that the hydro-booster mode has been selected ("YES" in S20), the brake ECU 70 determines whether the brake pedal has been released (S22).

If it is determined that depression of the brake pedal continues ("NO" in S22), the brake ECU 70 ends the current routine. On the other hand, if it is determined that the brake pedal has been released ("YES" in S22), the brake ECU 70 determines whether a predetermined length of time has elapsed since the brake pedal is released (S24). If it is determined that the predetermined length of time has not yet elapsed ("NO" in S24), the brake ECU 70 periodically executes S24 until it is determined that the predetermined length of time has elapsed. The predetermined length of time is set to the time required for the hydraulic fluid to be discharged from the wheel cylinders 23 to the master cylinder 32 when the built-in springs of the cut valves are functioning normally. Accordingly, if the wheel cylinder pressure is not sufficiently reduced after the predetermined length of time has elapsed, it may be determined that confinement of the wheel cylinder pressure has occurred.

On the other hand, if it is determined that the predetermined length of time has elapsed ("YES" in S24), the brake ECU 70 determines whether the control pressure sensor 73 is functioning normally (S26). In the second embodiment of the invention, the control pressure sensor 73 has a self-diagnostic function, and checks whether a malfunction, such as a disconnection or short-circuit in a sensor, has occurred, for example, during system startup. The check results are transmitted from the control pressure sensor 73 to the brake ECU 70 and stored in the brake ECU 70.

If it is determined that the control pressure sensor 73 is operating normally ("YES" in S26), the brake ECU 70 determines whether confinement of the wheel cylinder pressure has occurred (S30). More specifically, the brake ECU 70 determines whether $P_{fr}-P_{fr0}$, i.e., the difference between the measured value $P_{fr}$ obtained by the control pressure sensor 73 and the reference hydraulic pressure $P_{fr0}$, is greater than the threshold value a. If it is determined that the difference $P_{fr}-P_{fr0}$ is greater than the threshold value a, it is determined that confinement of the wheel cylinder pressure has occurred. If it is determined that confinement of the wheel cylinder pressure has occurred ("YES" in S30), the brake ECU 70 executes a control to eliminate the confinement of the wheel cylinder pressure. On the other hand, if it is determined that confinement of the wheel cylinder pressure has not occurred ("NO" in S30), the brake ECU 70 ends the current routine.

The reference hydraulic pressure $P_{fr0}$ is set to, for example, the wheel cylinder pressure that will be reached when it is determined in S24 that the predetermined length of time has elapsed in the case where the built-in springs of the cut valves are functioning normally. For instance, the reference hydraulic pressure $P_{fr0}$ may be set to the atmospheric pressure. The threshold value α is appropriately set so that confinement of the wheel cylinder pressure is actually detected. The reference hydraulic pressure $P_{fr0}$ and the threshold value α may be determined experimentally or empirically.

If a malfunction is detected in the control pressure sensor 73 ("NO" in S26), the brake ECU 70 determines whether an affirmative determination was made in the preceding routines (S28). If it is determined that an affirmative determination was made in the preceding routines, confinement of the wheel cylinder pressure occurred before. Therefore, there is a high possibility that confinement of the wheel cylinder pressure will occur. Therefore, if it is determined that an affirmative determination was made in the preceding routines ("YES" in S28), the brake ECU 70 executes the control to eliminate the confinement of the wheel cylinder pressure. On the other hand, if it is determined that an affirmative determination was not made in the preceding routines ("NO" in S28), the brake ECU 70 ends the current routine. If it is determined that an affirmative determination was not made in the preceding routines, the brake ECU 70 may keep the pressure-decreasing linear control valve 67 open for a predetermined length of time. In this way, confinement of the wheel cylinder pressure in the rear system is reliably prevented.

In the control for eliminating confinement of the wheel cylinder pressure, the brake ECU 70 opens at least one of the ABS pressure-decreasing valves 56 and 57 for the front wheels (S32), and keeps the pressure-decreasing valve open for a predetermined length of time (S34). If it is determined that the predetermined length of time has elapsed ("YES" in S34), the brake ECU 70 closes the ABS pressure-decreasing valves (S36).

The brake ECU 70 determines whether the measured value $P_{fr}$ obtained by the control pressure sensor 73 has decreased by an amount equal to or larger than a predetermined value (S38). If an affirmative determination is made, it is considered that the confinement of the wheel cylinder pressure has been eliminated by opening the ABS pressure-decreasing valve. Therefore, if it is determined that the measured value $P_{fr}$ obtained by the control pressure sensor 73 has decreased by an amount equal to or larger than the predetermined value ("YES" in S38), the brake ECU 70 sets a flag to indicate that an affirmative determination was made in the determination as to whether confinement of the wheel cylinder pressure has occurred (S40). On the other hand, if it is determined that the measured value $P_{fr}$ obtained by the control pressure sensor 73 has not decreased by an amount equal to or larger than the predetermined value ("NO" in S38), the brake ECU 70 ends the current routine.

In a modified example, the brake ECU 70 may open and close the partition valve 60 instead of the ABS pressure-decreasing valve. If primary importance is placed on the isolation of the two systems, i.e., the front system and the rear system, it would be appropriate to open and close the ABS pressure-decreasing valves. On the other hand, if primary importance is placed on the simplification of the control, it would be appropriate to open and close the partition valve 60.

Further, the first embodiment of the invention and the second embodiment of the invention may be combined with each other. That is, in the second embodiment of the invention, the brake ECU 70 may keep the pressure-decreasing linear control valve 67 open for a predetermined length of time regardless of whether confinement of the wheel cylinder pressure has occurred. In this way, it is possible to reliably prevent confinement of the wheel cylinder pressure in the rear system.

When the control for eliminating the confinement of the wheel cylinder pressure ends, usually, the wheel cylinder pressure has been decreased to the atmospheric pressure. Therefore, the brake ECU 70 may adjust the zero point of the relevant sensor by using the measured value Pfr obtained by the control pressure sensor 73 when the control ends.

The embodiments of the invention that have been described in the specification are to be considered in all respects as illustrative and not restrictive. The technical scope of the invention is defined by claims, and all changes which come within the meaning and range of equivalency of the claims are therefore intended to be embraced therein.

What is claimed is:

1. A brake control apparatus, comprising:
a plurality of wheel cylinders that apply braking force to respective wheels of a vehicle in response to a supply of a hydraulic fluid to the wheel cylinders;
a manual hydraulic pressure source that pressurizes a hydraulic fluid in accordance with an operation of a brake performed by a driver and sends the pressurized hydraulic fluid to the wheel cylinders;
a cut valve which is arranged in a hydraulic fluid delivery path between the manual hydraulic pressure source and the wheel cylinders, and to which a force is applied in such a direction that the cut valve is closed when a hydraulic pressure in the wheel cylinders is higher than a hydraulic pressure in the manual hydraulic pressure source;
a pressure-decreasing valve that decreases the hydraulic pressure in the wheel cylinders;
a partition valve that divides the hydraulic fluid delivery path into a first system through which the hydraulic fluid is supplied to at least one of the wheel cylinders and a second system through which the hydraulic fluid is supplied to the other of the wheel cylinders; and
a controller that controls a discharge path, through which the hydraulic fluid is discharged from the wheel cylinders,
wherein the hydraulic fluid delivery path is formed in such a manner that communication is mechanically provided through the first system and the second system, between the manual hydraulic pressure source and the wheel cylinders, in a non-controlled state, and
wherein the controller opens at least one of the pressure-decreasing valve and the partition valve in response to a release of the brake in a case where a braking force is generated by delivering the hydraulic fluid through the hydraulic fluid delivery path in accordance with the operation of the brake in the non-controlled state.

2. The brake control apparatus according to claim 1, further comprising:

a hydraulic pressure sensor that measures the hydraulic pressure in the at least one wheel cylinder, wherein the controller determines whether the hydraulic pressure is confined within the at least one wheel cylinder based on a measured value obtained by the hydraulic pressure sensor when the brake is released, and controls the discharge path if it is determined that the hydraulic pressure is confined within the at least one wheel cylinder.

* * * * *